J. B. WIARD.
DRIVING WHEEL.
APPLICATION FILED JAN. 11, 1909.
996,384.
Patented June 27, 1911.
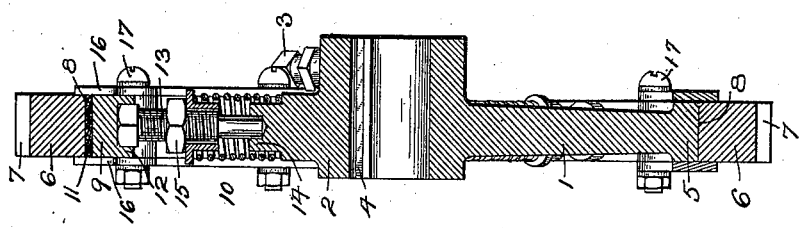
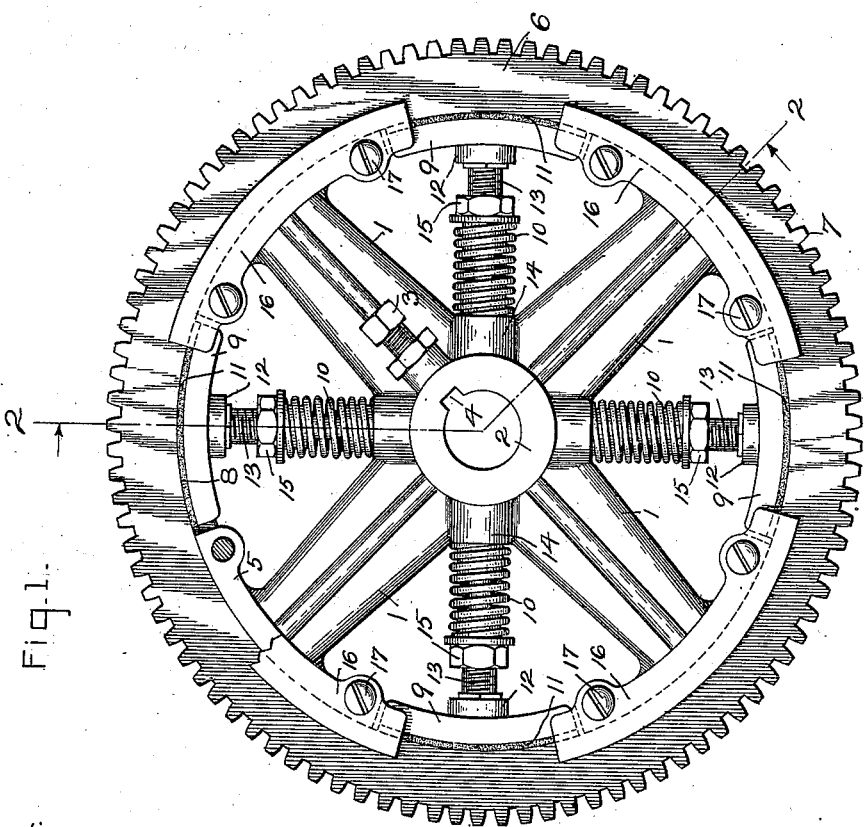
WITNESSES:
M. Ray Taylor.
J. Ellis Eler.
INVENTOR:
JOHN B. WIARD
BY
ATTY

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DRIVING-WHEEL.

996,384. Specification of Letters Patent. Patented June 27, 1911.

Application filed January 11, 1909. Serial No. 471,612.

*To all whom it may concern:*

Be it known that I, JOHN B. WIARD, a citizen of the United States, residing at Lynn, county of Essex, State of Massachusetts, have invented certain new and useful Improvements in Driving-Wheels, of which the following is a specification.

My invention relates to driving wheels and more particularly to such wheels in which the spider portion frictionally drives the rim, so that in case an overload occurs on the rim of the wheel, the spider will slip inside thereof.

The object of my invention is a novel arrangement and construction of parts.

My invention consists in a driving wheel comprising a spider having arms separated at their outer ends, a loose rim surrounding said spider and having a cylindrical inner surface, friction shoes engaging substantially the entire width of said cylindrical surface and fitting between the outer ends of said arms, and adjustable springs forcing said shoes outwardly.

For a better understanding of my invention and the advantages possessed by it, reference may be had to the following description taken in connection with the accompanying drawing, in which—

Figure 1 is a plan view of a driving wheel in accordance with my invention, and Fig. 2 is a sectional view on the line 2—2 of Fig. 1, looking in the direction of the arrows.

Referring to the drawing, the spider has arms 1 extending outwardly from the hub 2, which is provided with a set screw 3 and key-way 4, in order to fasten the spider to a shaft. The arms 1 are separated at their outer ends 5 by which I mean, the arms are not connected to a rim at their outer ends. A rim 6, which I have chosen to illustrate with teeth 7, surrounds the spider and has a cylindrical inner surface 8. Friction shoes 9 engage substantially the entire width of the cylindrical surface 8, and are forced outwardly by means of adjustable springs 10.

The surfaces of the shoes 9 have pieces of leather 11 fastened thereto. The shoes have projecting portions 12 which are provided with holes into which the heads of the bolts 13 fit. The inner ends of the bolts are guided in holes in the projections 14 on the hub. The springs 10 surround the bolts and their tensions are adjusted by the nuts 15. By means of these adjustments the pressure of the friction shoes 9 upon the inner surface 8 of the rim is regulated. Clamping plates 16 are fastened to the outer ends 5 of the arms by means of bolts 17 and hold the loose rim 6 in place. These plates 16 also form a guide for the shoes 9.

When the springs have been adjusted so as to give the required pressure, the rim 6 will be stationary with respect to the spider as long as the load upon the rim does not exceed the friction of the shoes upon the rim. When the load exceeds this amount, the rim will revolve upon the friction shoes.

What I claim as new and desire to secure by Letters Patent of the United States, is,—

A driving wheel comprising a spider having arms separated at their outer ends, a loose rim surrounding said spider and having a cylindrical inner surface, friction shoes engaging substantially the entire width of said cylindrical surface and fitting between the outer ends of said arms, clamping plates fastened to said arms, holding said rim in place and forming guides for said friction shoes, and adjustable springs forcing said shoes outwardly.

In witness whereof, I have hereunto set my hand this seventh day of January, 1909.

JOHN B. WIARD.

Witnesses:
JOHN A. MCMANUS, Jr.,
HENRY O. WESTENDARP.

---

Copies of this patent may be obtained for five cents each, by addressing the "Commissioner of Patents, Washington, D. C."